United States Patent [19]
Fonseca

[11] Patent Number: 4,810,371
[45] Date of Patent: Mar. 7, 1989

[54] PROCESS FOR FINE COAL CLEANING

[75] Inventor: Anthony G. Fonseca, Pittsburgh, Pa.

[73] Assignee: Consolidation Coal Company, Pittsburgh, Pa.

[21] Appl. No.: 140,060

[22] Filed: Dec. 31, 1987

[51] Int. Cl.$^4$ .................. B03D 1/02; B03D 1/10; C02F 1/00

[52] U.S. Cl. ..................... 209/166; 209/1; 210/709; 210/744; 210/86

[58] Field of Search ............ 209/164, 166, 167, 1; 210/709, 744, 104, 86, 101, 202

[56] References Cited

U.S. PATENT DOCUMENTS

| | | | |
|---|---|---|---|
| 3,960,726 | 6/1976 | Peterson | 210/744 |
| 4,040,954 | 8/1977 | Chandler | 210/709 |
| 4,576,723 | 3/1986 | Eisalauer | 210/709 |
| 4,675,116 | 6/1987 | Hoyland | 210/704 |
| 4,707,272 | 11/1987 | Kistler | 210/744 |

FOREIGN PATENT DOCUMENTS

| | | | |
|---|---|---|---|
| 819868 | 9/1959 | United Kingdom | 209/166 |
| 2182172 | 5/1987 | United Kingdom | 209/166 |

Primary Examiner—David L. Lacey
Assistant Examiner—Thomas M. Lithgow
Attorney, Agent, or Firm—Alan N. McCartney

[57] ABSTRACT

A process for automating fine coal cleaning including monitoring the operation of a flotation cell for separating coal from ash impurities by automatically detecting the coal content of the tailings from the cell and controlling the supply of additives to the cell to optimize slurry coal recovery and automatically monitoring the fluid level of the coal slurry in a dewatering filter tub to control the supply of additives to the filter tub and functioning of a dewatering filter.

3 Claims, 1 Drawing Sheet

PROCESS FOR FINE COAL CLEANING

BACKGROUND OF THE INVENTION

1. Field of the Invention

This invention relates to a process for automatically controlling fine coal cleaning circuits.

2. Summary of the Prior Art

In the processing of coal into various sizes, the fine uncleaned coal of a 28 mesh×0 or 100 mesh×0 can be placed in a flotation cell to separate the coal fines from the ash forming impurities. The coal fines collected from the flotation cell are then passed into a filter tub containing a filter to dewater the coal fines. U.S. Pat. No. 4,552,651 illustrates a flotation cell for separating fine coal from ash forming impurities.

In the froth flotation process for removal of fine combustible coal from the unwanted ash-forming minerals, a frother and collector and water are mixed with the coal in flotation cell and the resulting slurry is aerated so that bubbles adhere to the coal and the coal rises to the surface of the cell and is removed. The flotation product (coal slurry) removed from the flotation cell is thereafter passed to a filter for dewatering. Rotating vacuum disc filters pass through the flotation product in a filter tub. A flocculant is added to the filter tub and the coal cakes on the filters during dewatering and is stripped from the filters for downstream processing. (For a discussion of disc filter coal fines dewatering see "Coal Preparation and Unit-Train Loading," Coal Age, pp. 183-199 (July 1972).

In the past, attempts have been made to automatically control the flotation cell performance of this type of fine coal cleaning circuit. U.S. Pat. No. 4,552,651 illustrates one approach to controlling the flotation cell operation.

None of the prior art processes for fine coal cleaning have, however, combined automatic flotation cell performance with an automatic filter control to optimize fine coal cleaning.

SUMMARY OF THE INVENTION

It is the purpose of this invention to combine automatic flotation cell control with automatic control of the dewatering filter in a fine coal cleaning circuit.

It is an object of this invention to interact a photoconductor flotation cell tailings monitor for optimizing flotation cell performance with a coal fines dewatering filter control which automatically adjusts to the filter tub slurry level to control flocculant addition and filter speed to maximize filter performance.

DESCRIPTION OF THE PREFERRED EMBODIMENT

Figure 1:
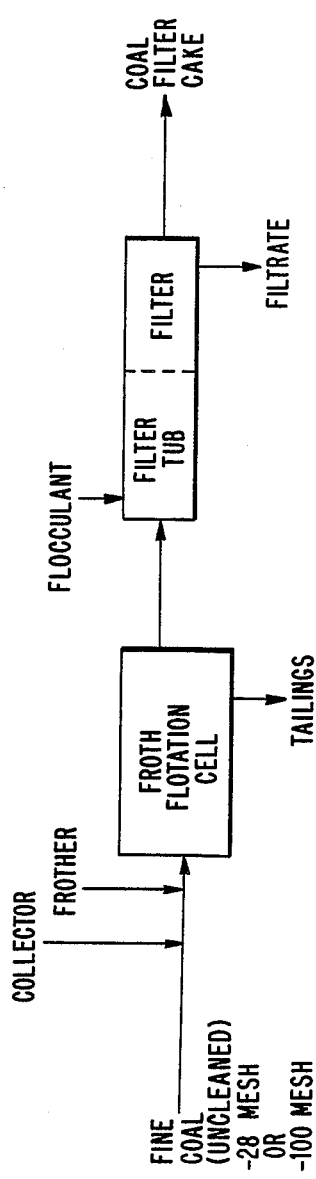
FIG. 1 is a diagramatic illustration of the conventional prior art fine coal cleaning circuit.

Reference is made to FIG. 1 which illustrates a conventional fine coal cleaning circuit. Fine coal along with a frother and possibly a collector such as fuel oil is added with water to a froth flotation cell. Aeration of the resulting slurry causes the formed bubbles to adhere to the coal which rises to the surface of the cell and the coal slurry is removed. The cell operation has been controlled in the past by visual observation of the hue of the gray of the cell slurry. A light gray color will indicate a high impurities content and a darker gray will be indicative of a high coal content. The visual inspection by the cell operator and subsequent manual manipulation of the addition of frother and collector to the cell to optimize coal removal is subject to the obvious disadvantage of inconsistency of control and human error.

Commonly owned U.S. Pat. No. 4,552,651 illustrates an attempt to control flotation cell operation by measurement of the pulp density of the cell.

In the conventional fine coal cleaning circuit thus described, the collected coal slurry, when removed from the flotation cell is passed to a filter which dewaters the coal to form a cake of coal. In the filter tub (See FIG. 1), a flocculant is added to the slurry to enhance adhesion of the coal fines. In the filter, a number of disc shaped filters rotate on a shaft through the slurry. A vacuum inside the disc draws water through the filter media and the coal solids form a cake in the filter. The cake is subsequently stripped from the filter. Current operators maintain the filtering phase of the circuit by observing the filter tub level to assure the tub does not overflow.

It can thus be seen that the above-described conventional method of manually controlling the flotation cell and level of the filter tub does not optimize fine coal cleaning and recovery. Because processing feed rates change, and due to processing different coals with different response characteristics to flotation additives and flocculants, coupled with fine coal size consistencies, it is desirable to provide an interacting automatic control of the flotation cell and filter to optimize fine coal cleaning.

Figure 2:
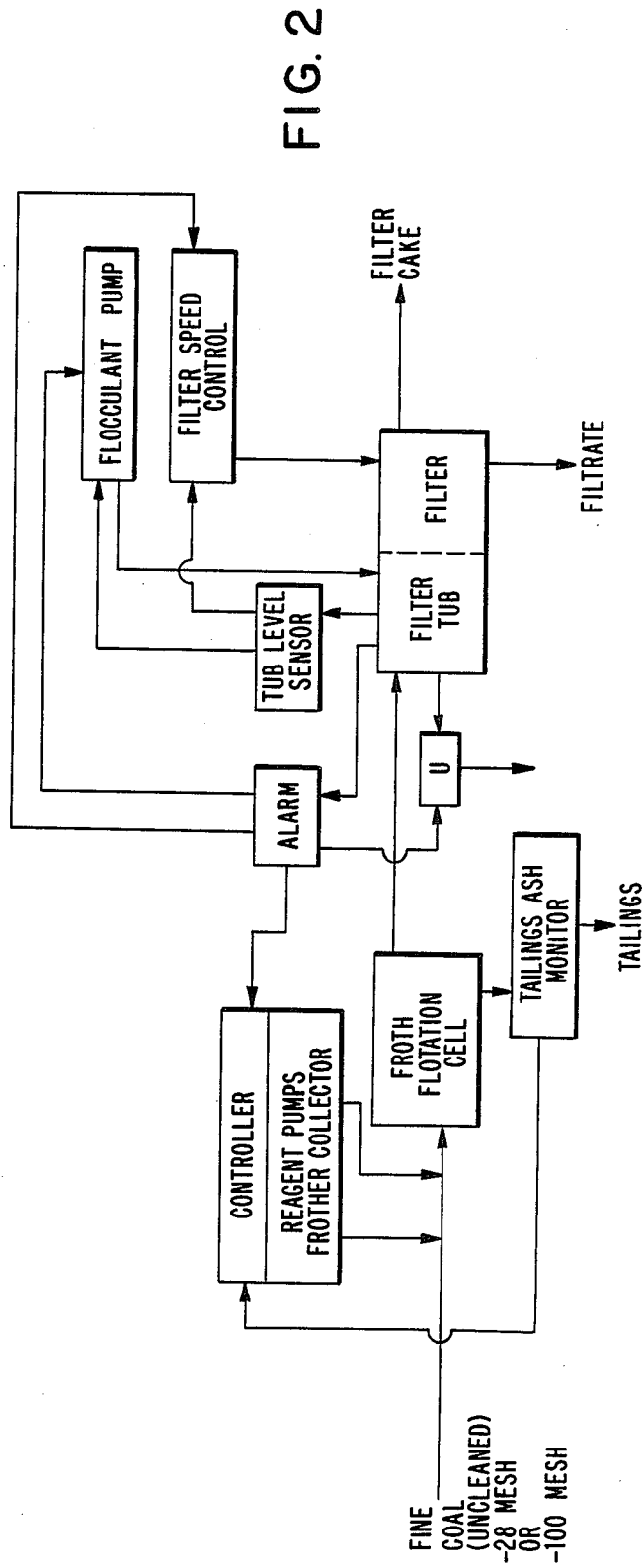
FIG. 2 is a diagramatic illustration of the fine coal cleaning circuit of this invention.

Attention is now directed to FIG. 2 which illustrates the automatic control of the fine coal cleaning system that observes the various parameters of the system and adjusts for optimizing the process.

In commonly owned copending U.S. patent application Nos. 117,263 filed Nov. 6, 1987 and 117,264 filed Nov. 6, 1987, there is disclosed apparatus for controlling the operation of a fine coal processing flotation cell, and the disclosures therein are incorporated herein by reference. In the above-mentioned copending applications, and as diagramatically illustrated in FIG. 2, the tailings from the flotation cell are passed through a tailings monitor.

In the flotation cell operation, the degree of coal separation from the ash-forming impurities can be detected in the tailings. If the tailings are a black color, coal is present in large amounts (coal absorbs light) which is indicative of poor coal recovery in the cell. Tailings that are light gray in color are high in clay content and low in coal amounts. As set forth in the aforementioned copending applications, a photoconductor can read the hue of the gray of the flotation cell tailings and through a process controller signal the frother and collector pumps to vary the addition of the additives to the flotation cell to optimize fine coal recovery in the cell.

In this invention, the flotation product enters the filter tub for dewatering. (See FIG. 2). A tube level sensor such as a bubble tube will indicate the level of the slurry in the tub. This level information is used through prior calibration of the sensor to change and control the speed of the filter. Thus, as more coal is added to the tub (higher coal recovery in the flotation cell), the tub level increases and the speed of the filters will automatically increase in response to the level sensor to permit more coal recovery. Additionally, the tub level sensor can also be used to change and control the amount of flocculant addition by interacting with the flocculant pump. For example, it is desirable to operate at optimum flocculant dosage rate (lbs. of floc per ton of coal recovery) and changes in coal feed from the flotation cell will necessitate changes in the addition of flocculant.

The tub should also be equipped with a level alarm so that an overriding control of both flocculant addition and frother/collector addition to the flotation cell is maintained to prevent filter tub overflow.

The overflow alarm can activate rapid increases and decreases in any and all of the additives used (frother, collector flocculant) as well as possible addition of other additives such as promoters that will keep the filter tub from overflowing. It could also activate a valve to lower the tub level (See FIG. 2).

It can thus be seen that automatic tailings ash monitoring from the flotation cell to optimize coal recovery in the cell is combined with automatic filter speed control and flocculant addition based on filter tub level to provide a fine coal cleaning circuit.

I claim:

1. In a process for automatically controlling a fine coal cleaning and recovery circuit in which coal is separated from ash forming inpurities in a flotation cell supplied with additives to form a coal slurry flotation product, and the resultant flotation produce enters a filter tub to which a flocculant is added with the flotation product being dewatered in a filter to form a coal caking, wherein the improvement comprises:
   (a) placing a photoconductor in tailings from the flotation cell to monitor the coal recovery of the cell and automatically control the amount of additive supplied to the cell in response to said monitored coal recovery in said cell to optimize coal recovery from the cell; and
   (b) sensing the level of the flotation product in the filter tub and automatically adjust the amount of flocculant supplied to the filter tub in response to said sensed product level to maximize coal recovery.

2. The process of claim 1 wherein said filter comprises a rotating disc filter and the process further includes automatically controlling the speed of the filter in response to product level sensed in the filter tub.

3. The process of claim 2 further including automatically adjusting the amount of additives supplied to the flotation cell in response to the flotation product level in the filter tub.

* * * * *